US010062872B2

(12) United States Patent
Harayama

(10) Patent No.: US 10,062,872 B2
(45) Date of Patent: Aug. 28, 2018

(54) SEALED BATTERY

(71) Applicant: TOYOTA JIDOSHA KABUSHIKI KAISHA, Toyota-shi, Aichi-ken (JP)

(72) Inventor: Takashi Harayama, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 144 days.

(21) Appl. No.: 15/081,086

(22) Filed: Mar. 25, 2016

(65) Prior Publication Data

US 2016/0285058 A1   Sep. 29, 2016

(30) Foreign Application Priority Data

Mar. 27, 2015   (JP) ................... 2015-066864

(51) Int. Cl.
H01M 2/06 (2006.01)
H01M 2/30 (2006.01)
H01M 10/0525 (2010.01)
H01M 2/04 (2006.01)
H01M 2/08 (2006.01)
H01M 2/22 (2006.01)

(52) U.S. Cl.
CPC ............ *H01M 2/06* (2013.01); *H01M 2/043* (2013.01); *H01M 2/0456* (2013.01); *H01M 2/08* (2013.01); *H01M 2/22* (2013.01); *H01M 2/305* (2013.01); *H01M 10/0525* (2013.01); *H01M 2/0473* (2013.01); *H01M 2/30* (2013.01); *H01M 2220/20* (2013.01)

(58) Field of Classification Search
CPC .......... H01M 2/06; H01M 2/043; H01M 2/08; H01M 2/305; H01M 10/0525; H01M 2220/20
See application file for complete search history.

(56) References Cited

U.S. PATENT DOCUMENTS

2015/0179992 A1   6/2015 Harayama
2015/0180007 A1*  6/2015 Ohta ................... H01M 2/04
                                                429/179

FOREIGN PATENT DOCUMENTS

| EP | 2 461 393 A1 | 6/2012 |
| JP | 08-203494 A | 8/1996 |
| JP | 3573853 B2 | 10/2004 |
| JP | 2009-48969 A | 3/2009 |
| JP | 2012-182070 A | 9/2012 |

(Continued)

Primary Examiner — Osei K Amponsah
(74) Attorney, Agent, or Firm — Sughrue Mion, PLLC

(57) ABSTRACT

A sealed battery includes an electrode assembly; a case having an opening portion and accommodating the electrode assembly; a lid closing the opening portion and having a through-hole; a collector terminal including an inner terminal segment and a projection; and an insulating seal in contact with a bottom surface of the lid, the bottom surface being an inner side of the lid in a thickness direction of the lid, the inner side of the lid facing an inside of the case when the lid closes the opening portion, and the insulating seal providing sealing between the lid and the collector terminal. The lid has a protrusion protruding from the bottom surface of the lid. The protrusion surrounds the through-hole. A part of the protrusion protrudes into the through-hole. The through-hole has a smallest opening diameter at a position at which the part of the protrusion protrudes into the through-hole.

5 Claims, 5 Drawing Sheets

(56) References Cited

FOREIGN PATENT DOCUMENTS

| JP | 2014-007119 A | 1/2014 |
|----|---------------|--------|
| JP | 2014-116139 A | 6/2014 |
| WO | 2014/002819 A1 | 1/2014 |

* cited by examiner

SEALED BATTERY

CROSS-REFERENCE TO RELATED APPLICATIONS

This application claims priority from Japanese Patent Application No. 2015-066864 filed on Mar. 27, 2015, the disclosure, including the specification, drawings and abstract, of which is incorporated herein by reference in its entirety.

BACKGROUND

1. Field

The disclosure relates to a sealed battery.

2. Description of Related Art

Lithium-ion secondary batteries, nickel-metal-hydride batteries, and other kinds of sealed secondary batteries have become increasingly important in recent years as power sources to be mounted in vehicles, and power sources for personal computers and portable terminals. Sealed lithium-ion secondary batteries, which are lightweight and have high energy density, are especially expected to be more widespread as high-output power sources mounted in vehicles.

A typical sealed battery includes a case having an opening portion, an electrode assembly accommodated in the case, and a lid welded to the opening portion of the case to seal the opening portion. The lid has through-holes extending through the lid in a thickness direction of the lid. The through-holes are spaces that open on the outer side of the lid, extend in the thickness direction of the lid to the backside of the lid (inner side of the lid on the inside of the battery), and open on the backside of the lid. The electrode assembly is electrically connected to collector terminals having portions that pass through the through-holes and project from the lid.

Each collector terminal may be fixed to the lid, for example, in the following method. A portion of the cylindrical collector terminal is passed through through-holes formed in an external terminal, an insulator, the lid, and an insulating seal (gasket), the portion of the terminal is projected from the through-holes, and then the top end of the projecting portion of the terminal is deformed such that the top end of the terminal expands radially outward with respect to the central axis of the projecting portion of the terminal (i.e. the projection portion is riveted). In this way, the collector terminal is fixed to the lid. The projecting portion that has expanded may be joined to the top surface of an external connection terminal by laser welding when needed. When the collector terminal is fixed to the lid in this method, the gasket provides sealing between the lid and the collector terminal. This makes it possible to prevent leakage of gas from the through-hole of the lid through which the collector terminal is passed, and to prevent a short-circuit between the collector terminal and the lid.

Such a sealing structure including a lid, collector terminals, and gaskets is described in each of Japanese Patent Application Publication No. 2014-7119 (JP 2014-7119 A), Japanese Patent Application Publication No. 2014-116139 (JP 2014-116139 A), Japanese Patent Application Publication No. 8-203494 (JP 8-203494 A), and Japanese Patent Application Publication 2012-182070 (JP 2012-182070 A). Each of these documents describes a sealing structure in which the bottom surface of a lid (i.e. the surface in contact with a gasket) is provided with a downward protrusion, so that a portion of the gasket is compressed. This structure further improves the sealability in the vicinity of a collector terminal.

SUMMARY

FIG. 7 is a schematic sectional view of a main portion of a conventional sealing structure including a lid 922, a collector terminal 940, and an insulating seal (gasket) 950. As illustrated in FIG. 7, the gasket 950 is disposed between the lid 922 and the collector terminal 940. An insulator 960 is disposed on the lid 922. A downward protrusion 910 is provided on the bottom surface of the lid 922 that is in contact with the gasket 950.

The inventor has found that, when the lid 922 is provided with the protrusion 910, a gap 970 is formed between the gasket 950 and a rounded surface 943 located between a horizontal surface 941 and a vertical surface 942 of the collector terminal 940 in some cases. In the case where the gap 970 is formed, when the resilience of the gasket 950 is decreased due to aged deterioration thereof, the gasket 950 may creep toward the gap 970, causing a decrease in sealability. There is room for improvement in long-lasting sealability.

The features described below provide a sealed battery configured to maintain appropriate sealability between a collector terminal and an insulating seal (gasket) over a long period of time.

A sealed battery according to a first non-limiting embodiment includes an electrode assembly, a case having an opening portion and accommodating the electrode assembly, a lid closing the opening portion and having a through-hole (i.e., a space that opens on the outer side of the lid, extends in the thickness direction of the lid to the backside of the lid (inner side of the lid of the battery), and opens on the backside of the lid: hereinafter, this space will be referred to as "through-hole"), a collector terminal including an inner terminal segment electrically connected to the electrode assembly in the case and a projection passing through the through-hole of the lid and projecting outward from the lid, and an insulating seal in contact with a bottom surface (inner surface) of the lid, the bottom surface (inner surface) being an inner side of the lid in a thickness direction of the lid, the inner side of the lid facing an inside of the case when the lid closes the opening portion, and the insulating seal providing sealing between the lid and the collector terminal. The lid has a protrusion protruding from the bottom surface of the lid. The protrusion surrounds the through-hole. A part of the protrusion protrudes into the through-hole. The opening diameter of the through-hole is smallest at a position at which the part of the protrusion protrudes into the through-hole. With this structure in which the part of the protrusion provided on the lid protrudes into the through-hole, the insulating seal is appropriately pressed (compressed) toward the collector terminal. Thus, sealability between the collector terminal and the insulating seal is maintained appropriately over a long period of time (hereinafter, referred to as "long-term sealability"). The protrusion is typically located at the edge of the lid close to the through-hole, that is, the periphery of the through-hole.

A first acute angle defined by a reference line extending along the bottom surface of the lid and a first inclined surface of the protrusion may be within a range from 40° to 70°, in a section taken along the direction of the hole axis of the through-hole. The first inclined surface defines at least a part of the through-hole. In this disclosure, the term "hole axis" of the through-hole indicates the axis that passes through the center of the through-hole and is perpendicular to a radial direction of the through-hole (i.e., the direction in which the through-hole extends through the lid). The insulating seal is more appropriately pressed (compressed) toward the collector terminal by setting the first acute angle to a value within the range from 40° to 70°. When the collector terminal is riveted to be fixed to the lid during the assembly of the battery, an external force is applied in the direction of the hole axis of the through-hole. However, the protrusion is formed such that the first acute angle is within the range from 40° to 70°, and thus the protrusion and the collector terminal compress the insulating seal in both the hole-axis direction and radial direction of the through-hole. Consequently, the insulating seal is strongly pressed (compressed) toward the collector terminal, which prevents formation of a gap between the insulating seal and the collector terminal and achieves long-term high sealability.

A second acute angle defined by the reference line and a second inclined surface of the protrusion may be smaller than the first acute angle, in the section taken along the direction of the hole axis of the through-hole. The second inclined surface is located outward of the first inclined surface in the radial direction of the through-hole. The protrusion having this configuration strongly compresses (or comes into close contact with) the insulating seal in the hole-axis direction and radial direction of the through-hole when the collector terminal is riveted to be fixed to the lid during the assembly of the battery. This further reliably prevents formation of a gap between the insulating seal and the collector terminal and achieves long-term higher sealability.

The insulating seal may be made of a fluororesin. This reliably prevents insufficient riveting.

The lid may be made of 1000 series aluminum or 3000 series aluminum. These materials have favorable workability, and thus using these materials facilitates the formation of protrusions.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
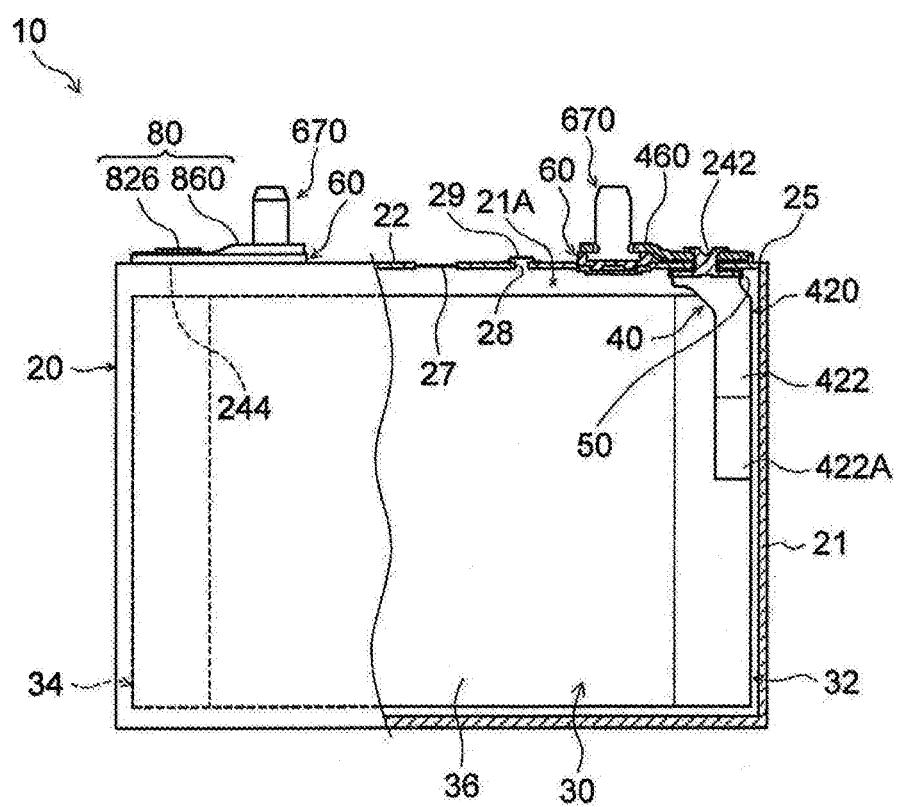
FIG. 1 is a partial sectional view schematically illustrating the appearance of a sealed battery according to a non-limiting embodiment.

Hereinafter, an exemplary embodiment will be described with reference to the attached drawings. In the drawings, members and portions that yield the same effects are denoted by the same reference numerals or symbols, and overlapped description thereof will be omitted or simplified. The actual dimensional relationships among, for example, length, width, and thickness are not always reflected in the drawings. Matters that are not particularly mentioned in this specification but that are necessary to implement the features disclosed should be understood as design matters that those skilled in the art can conceive of based on the related art in this technical field.

A lithium-ion secondary battery will be described as an example of a sealed battery according to anon-limiting embodiment, but the battery to which this disclosure is applied should not be limited to the lithium-ion secondary battery. In this specification, the term "battery" indicates any electric storage device from which electric energy can be taken out, and "batteries" conceptually include a primary battery and a secondary battery. The term "secondary battery" indicates any repeatedly rechargeable electric storage device, and "secondary batteries" include so-called storage batteries (i.e., chemical batteries), such as lithium-ion secondary batteries, metal lithium secondary batteries, nickel-metal-hydride batteries, and nickel-cadmium batteries, and capacitors (i.e., physical batteries), such as electric double layer capacitors. The technique described in this specification is typically and preferably applied to sealed secondary batteries.

FIG. 1 is a partial sectional view schematically illustrating the appearance of a lithium-ion secondary battery 10 according to an embodiment. The lithium-ion secondary battery 10 includes a flat prismatic outer case 20 in which a rolled electrode assembly 30 including prescribed battery components is accommodated together with an appropriate electrolytic solution. In the present embodiment, the lithium-ion secondary battery 10 is a prismatic battery. However, the lithium-ion secondary battery 10 is not limited to a prismatic battery, and may be, for example, a cylindrical battery.

The outer case 20 includes a bottomed prismatic case body 21 and a lid 22. One of the narrow surfaces of a flat rectangular parallelepiped shape of the outer case 20 is an opening portion 21A. The lid 22 closes the opening portion 21A. Specifically, the lid 22 is fixed to the case body 21 by fitting the lid 22 into the opening portion 21A of the case body 21 and subjecting a joint 25 to laser welding between the outer edge of an outer surface 22A of the lid 22 and a portion of the case body 21 around the opening portion 21A.

The outer case 20 (hereinafter, also referred to as "case 20") may be made of any material used for conventional sealed batteries. The case 20 is preferably made of mainly a light metal material having a high thermal conductivity. Examples of such metal material include aluminum, stainless steel, and nickel plated steel. In the present embodiment, the case 20 (specifically, the case body 21 and the lid 22) is made of aluminum or an aluminum alloy. Preferably, the lid 22 is made of 1000 series aluminum or 3000 series aluminum. These materials have favorable workability, and thus using these materials facilitates the formation of protrusions, which will be described later.

The lid 22 has a generally rectangular shape that conforms to the shape of the opening portion 21A (the shape of an opening of the case body 21). The lid 22 is provided with a safety valve 27 located at the center of the lid 22. When the internal pressure of the case 20 increases, the safety valve 27 provides communication between the inside and the outside of the case 20 to reduce the internal pressure in the case 20. An inlet 28 is provided adjacent to the safety valve 27, and an electrolytic solution is supplied through the inlet 28 during fabrication of the battery. After the electrolytic solution is supplied, a plug 29 is placed on or in the inlet 28 and fixed by welding. In this way, the inlet 28 is sealed (or closed).

The rolled electrode assembly 30 is accommodated in the case body 21, in such a position that the rolling axis extends in the horizontal direction. Like rolled electrode assemblies of commonly-used lithium-ion secondary batteries, the rolled electrode assembly 30 is prepared by laminating a positive electrode in the form of a sheet (positive-electrode sheet 32) and a negative-electrode in the form of a sheet (negative-electrode sheet 34) together with two separator sheets 36, rolling the obtained laminate in the longitudinal direction, and pressing the obtained rolled body from its side surface to flatten the rolled boy.

The rolled electrode assembly 30 may be made of any material and components used for electrode assemblies of conventional lithium-ion secondary batteries. In the present embodiment, the rolled electrode assembly 30 includes the positive-electrode sheet 32 having a positive-electrode active material layer on a long positive-electrode collector (for example, aluminum foil), the negative-electrode sheet 34 having a negative-electrode active material layer on a long negative-electrode collector (for example, copper foil), and the separator sheets 36.

The positive-electrode active material is preferably an oxide active material having a layered structure and used for positive electrodes of commonly-used lithium-ion secondary batteries or an oxide active material having a spinel structure. Typical examples of the active material include lithium transition metal oxides, such as lithium-cobalt oxides, lithium-nickel oxides, and lithium-manganese oxides. Examples of the negative-electrode active material include carbonaceous materials, such as graphite, non-graphitizable carbon (hard carbon), and graphitizable carbon (soft carbon).

The active material layers are formed with a binder. Examples of the binder include polyvinylidene fluoride (PVDF), polytetrafluoroethylene (PTFE), carboxymethyl cellulose (CMC), and styrene-butadiene rubber (SBR).

The active material layers may optionally contain a conductive material. Examples of the conductive material include carbonaceous materials, such as carbon black (for example, acetylene black) and graphite powder, and conductive metal powder, such as nickel powder.

Each separator 36 may be a porous sheet or nonwoven fabric, made of resin, such as polyethylene (PE), polypropylene (PP), polyester, cellulose, or polyamide.

The electrolytic solution provided between the positive-electrode sheet 32 and the negative-electrode sheet 34 preferably contains a nonaqueous solvent and a lithium salt (supporting electrolyte) soluble in the solvent. The nonaqueous solvent may be any of aprotic solvents, such as carbonates, esters, ethers, nitriles, sulfones, and lactones. For example, the nonaqueous solvent may be at least one kind of solvent selected from known nonaqueous solvents that can be commonly used as electrolytes of lithium-ion secondary batteries, such as ethylene carbonate (EC), propylene carbonate (PC), diethyl carbonate (DEC), dimethyl carbonate (DMC), and ethyl methyl carbonate (EMC).

The supporting electrolyte may be at least one kind of material selected from known lithium salts that can function as supporting electrolytes in electrolytic solutions of lithium-ion secondary batteries, such as $LiPF_6$, $LiBF_4$, $LiN(SO_2CF_3)_2$, $LiN(SO_2C_2F_5)_2$, $LiCF_3SO_3$, $LiC_4F_9SO_3$, $LiC(SO_2CF_3)_3$, and $LiClO_4$. The concentration of the supporting electrolyte (supporting electrolyte salt) is not limited to any particular concentration, and may be a concentration substantially the same as those of electrolytic solutions of conventional lithium-ion secondary batteries.

Figure 2:
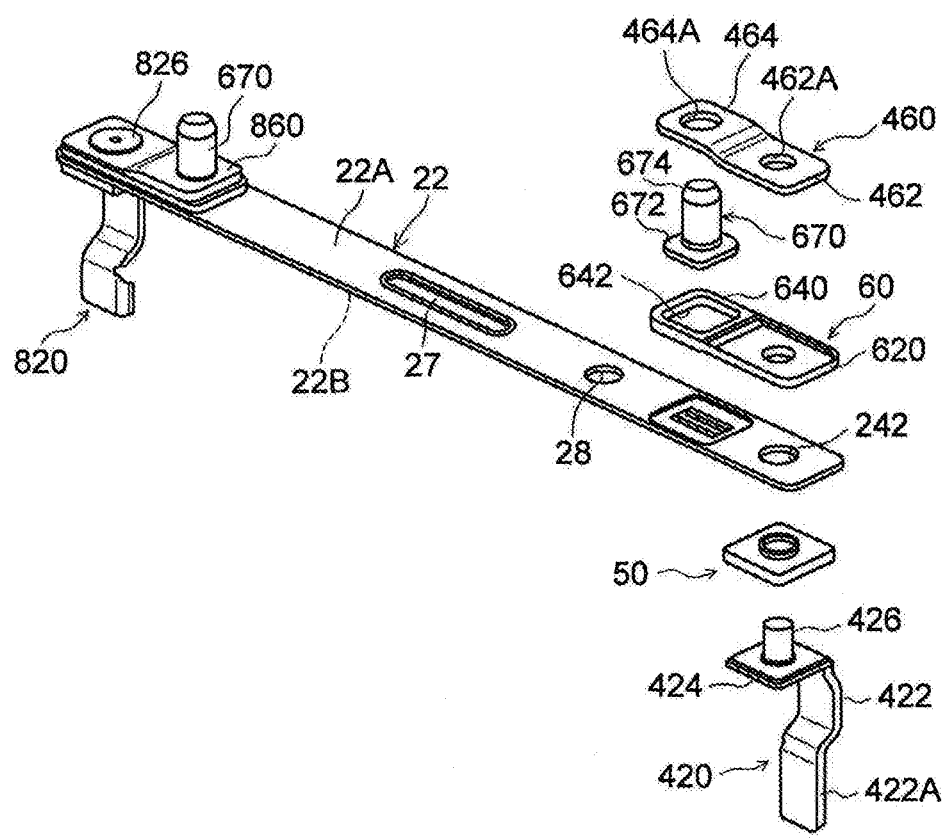
FIG. 2 is an exploded perspective view illustrating a lid and collector terminals of the battery in the embodiment.
Figure 3:
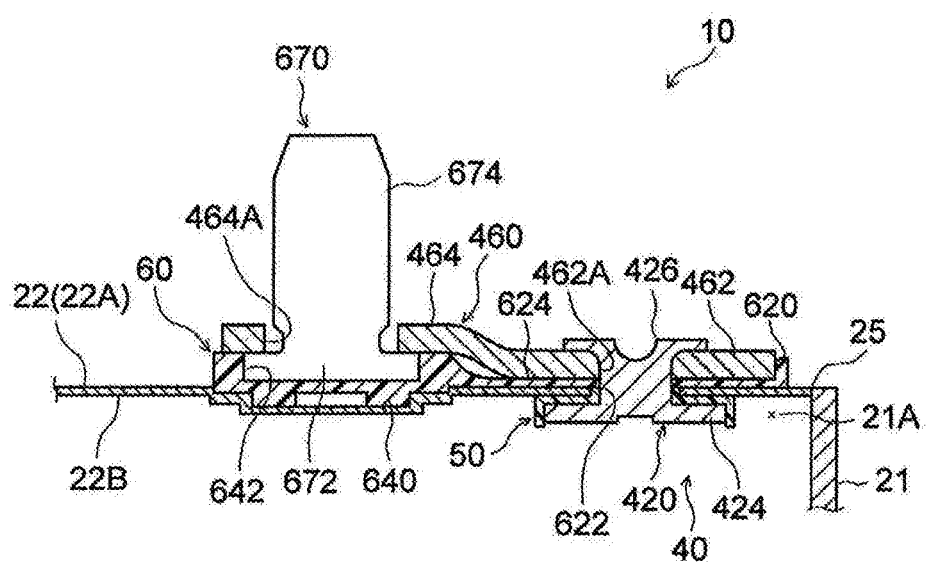
FIG. 3 is an enlarged sectional view of a portion of the battery in FIG. 1.

The positive-electrode sheet 32 and the negative-electrode sheet 34 are connected to a positive-electrode collector terminal 40 and a negative-electrode collector terminal 80, respectively. The collector terminal 40 and the collector terminal 80 pass through a positive-electrode through-hole 242 and a negative-electrode through-hole 244 (holes through which the collector terminals are pulled out) that are provided at one end and the other end of the lid 22 in its longitudinal direction, respectively. The collector terminals 40, 80 project to the outside of the outer case 20. As illustrated in FIG. 1 to FIG. 3, the positive-electrode collector terminal 40 includes a positive-electrode inner terminal segment 420 disposed mainly inside the outer case 20 and a positive-electrode outer terminal segment 460 disposed mainly outside the outer case 20, and the positive-electrode inner and outer terminal segments 420, 460 are connected to each other. The negative-electrode collector terminal 80 includes a negative-electrode inner terminal segment 820 and a negative-electrode outer terminal segment 860 that are formed into substantially the same shapes as those of the positive-electrode inner and outer terminal segments 420, 460, and the negative-electrode inner and outer terminal segments 820, 860 are connected to each other.

In the positive-electrode collector terminal 40, a bottom end 422A of the positive-electrode inner terminal segment 420 is joined to the positive-electrode sheet 32 by, for example, ultrasonic welding. The positive-electrode collector terminal 40 includes the positive-electrode inner terminal segment 420 and a projection 426. The positive-electrode inner terminal segment 420 has a first lead portion 422 in the form of a plate (strip) and a second lead portion 424 in the form of a plate. The first lead portion 422 extends from the bottom end 422A so as to be substantially perpendicular to the lid 22. The second lead portion 424 is formed so as to be contiguous with the top end of the first lead portion 422, extends from the top end of the first lead portion 422 (in a direction toward a person viewing FIG. 2) so as to be substantially perpendicular to the first lead portion 422, and extends substantially parallel to an inner surface (bottom surface) 22B of the lid 22. The projection 426 extends substantially perpendicularly from the center of the plate surface of the second lead portion 424 to the outside of the battery. The projection 426 is formed as a rivet. When the projection 426 is passed through the through-hole 242 and a through-hole (rivet hole) 462A of the positive-electrode outer terminal segment 460 and is then deformed such that projection 426 expands radially outward with respect to the central axis thereof (the projection 426 is riveted), the positive-electrode inner terminal segment 420 and the positive-electrode outer terminal segment 460 are connected (fixed) to each other. The positive-electrode inner terminal segment 420, the projection 426, and the positive-electrode outer terminal segment 460 are preferably made of a highly-conductive metal material, and are typically made of aluminum.

The positive-electrode outer terminal segment 460 has a first connection portion 462 and a second connection portion (outer end portion) 464. The first connection portion 462 has the through-hole 462A through which the projection 426 is passed before the projection 426 is deformed so as to expand radially outward (i.e. before the projection 426 is riveted). The second connection portion 464 extends from the first connection portion 462 in a direction toward the center of the lid 22 in its longitudinal direction, and is raised in a stepwise manner outward from the outer case 20. As illustrated in FIG. 2, the second connection portion 464 has a bolt-passing hole 464A through which a leg portion 674 of a bolt 670 can pass through. The leg portion 674 of the bolt 670 is passed through the bolt-passing hole 464A typically from below, a connecting member (not illustrated) for external connection is attached to the leg portion 674 projecting upward from the second connection portion 464, and a nut (not illustrated) is fastened, so that the connecting member is connected (fixed) to the positive-electrode outer terminal segment 460.

The above-described riveting is performed with an insulating seal (gasket) 50 disposed between the wall surface of the lid 22 that surrounds the through-hole 242 and the second lead portion 424 and with an insulator 60 disposed between the wall surface and the first connection portion 462 of the positive-electrode outer terminal segment 460. With the riveting, the positive-electrode collector terminal 40 is fixed to the lid 22 and the insulating seal (gasket) 50 is compressed between the lid 22 and the second lead portion 424 of the positive-electrode collector terminal 40 to seal the through-hole 242. This sealing structure will be described later.

The projection 426 may be joined to the top surface of the positive-electrode outer terminal segment 460 by laser welding to firmly fix the collector terminal 40 to the lid 22.

The insulator 60 has a fitting portion 620 and an extension portion 640. The fitting portion 620 is disposed between the wall surface of the lid 22 that surrounds the through-hole 242 and the first connection portion 462 of the positive-electrode outer terminal segment 460. The extension portion 640 extends between the second connection portion 464 of the positive-electrode outer terminal segment 460 and the lid 22. The fitting portion 620 has a tubular portion 622 and a saucer portion 624. The fitting portion 620 is passed through the through-hole 242 from the outside to prevent direct contact between the projection 426 and the lid 22 (to insulate the projection 426 from the lid 22). The saucer portion 624 (as shown in FIG. 3) is formed so as to be contiguous with the tubular portion 622 and extends along the outer surface 22A of the lid 22. The first connection portion 462 of the positive-electrode outer terminal segment 460 is disposed so as to conform to the recess of the saucer portion 624.

The extension portion 640 has a bolt-receiving hole 642. The bolt-receiving hole 642 has a rectangular opening shape having long sides extending in the longitudinal direction of the insulator 60 (the longitudinal direction of the insulator 60 coincides with the longitudinal direction of the lid 22). The bolt-receiving hole 642 can receive a head portion 672 of the bolt 670. The head portion 672 has a rectangular shape that is slightly smaller than the opening shape of the bolt-receiving hole 642 in a section perpendicular to the axis of the bolt 670. The bolt 670 is disposed (attached) such that the head portion 672 is inserted into the bolt-receiving hole 642 to restrict the rotation of the bolt 670 (prevent the corotation) and the leg portion 674 projects through the bolt-passing hole 464A.

The material of the insulating seal (gasket) 50 may include various kinds of resin materials that are resistant to the electrolytic solution to be used. Also, the material of the insulator 60 may include various kinds of insulating resin materials. Preferable examples of the material of the insulator 60 include resin materials mainly containing resins such as fluororesins (e.g. perfluoroalkoxy alkanes (PFAs) and polytetrafluoroethylene (PTFE)). The insulating seal (gasket) 50 may be made of the same resin material as that of the insulator 60. In the present embodiment, the insulating seal (gasket) 50 is made of a fluororesin. Because the fluororesin has a low coefficient of friction, a protrusion (described later) is allowed to smoothly enter the gasket 50 while the riveting is performed, so that insufficient riveting can be prevented. Hereinafter, the insulating seal in the present embodiment will be simply referred to as the gasket 50.

Figure 4:
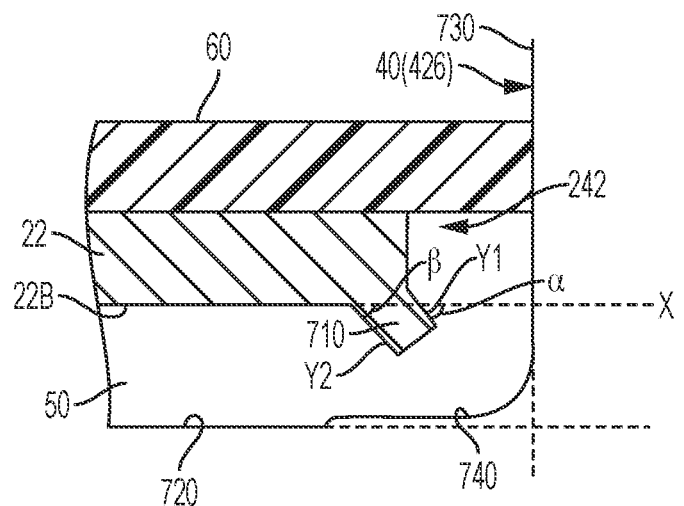
FIG. 4 is a schematic sectional view of a sealing structure including the lid, the collector terminal, and an insulating seal (gasket) in the embodiment.

Next, a sealing structure including the lid, the collector terminal, and the gasket in the present embodiment will be described with reference to FIG. 4. FIG. 4 is a schematic view of the sealing structure on the positive electrode side, and is a sectional view taken along the direction of the hole axis of the through-hole 242.

In FIG. 4, the gasket 50 is in contact with the bottom surface 22B of the lid 22 and provides sealing between the lid 22 and the positive-electrode collector terminal 40. The lid 22 has a protrusion 710 protruding obliquely downward from the bottom surface 22B. The protrusion 710 is provided so as to surround the through-hole 242 of the lid 22. In this structure, the lid 22 and the collector terminal 40 compress and hold the gasket 50. The gasket 50 is appropriately pressed toward the collector terminal 40 and compressed at an area near the protrusion 710 of the lid 22. Thus, the sealability is enhanced in this area. As illustrated in FIG. 4, a horizontal surface 720 of the collector terminal 40 (the top surface of the second lead portion 424) may be raised in the area near the protrusion 710 of the lid 22 to further enhance the sealability.

As illustrated in FIG. 4, the protrusion 710 is inclined toward a hole axis of the through-hole 242. That is, the protrusion 710 partially protrudes toward the hole axis of the through-hole 242, such that both side surfaces of the protrusion 710 are inclined toward the hole axis of the through-hole 242 in FIG. 4. The conventional sealing structure has a protrusion protruding parallel to the hole axis direction of the through-hole, and thus has a gap between the gasket and the rounded surface located between the horizontal surface and the vertical surface (the side surface of the projection) of the collector terminal in some cases. However, the structure provided with the protrusion 710 inclined toward the hole axis of the through-hole 242 so as to partially protrude toward the hole axis of the through-hole 242 can prevent formation of a gap because stress is applied toward a rounded surface 740 located between the horizontal surface 720 and a vertical surface 730. This can maintain appropriate sealability between the collector terminal and the gasket over a long period of time (long-term sealability).

As illustrated in FIG. 4, the protrusion 710 is located at the edge of the lid 22 close to the through-hole 242, that is, located at the periphery of the through-hole 242, and the opening diameter of the through-hole 242 is smallest at an inner end of the protrusion 710. Providing the protrusion 710 at the edge of the lid 22 close to the through-hole 242 can further reliably prevent the formation of a gap to enhance the long-term sealability. The protrusion 710 may be provided at any position at which the desired effect is achieved. For example, the protrusion 710 may be provided at a position slightly offset from the edge (i.e. the periphery of the through-hole 242) in the direction away from the through-hole 242.

In FIG. 4, an angle (acute angle) α defined by a reference line X extending along the bottom surface 22B of the lid 22 to an inclined surface Y1 of the protrusion 710 is shown. The inclined surface Y1 is a surface of protrusion 710 which is close to the hole axis of the through-hole 242. In other words, the inclined surface Y1 is located more inward with respect of a radial direction of the through-hole 242 than an inclined surface Y2 of the protrusion 710. The angle (acute angle) α is preferably within a range from 30° to 80°, and more preferably within a range from 40° to 70° (for example, within a range from approximately 45° to approximately 60°). In other words, the inclined surface Y1 may be inclined with respect to the reference line X at an angle in the range from 30° to 80°, and more preferably within a range from 40° to 70° (for example, within a range from approximately 45° to approximately 60°). Due to the formation of the protrusion 710 having the inclined surface Y1 inclined at the above-described angle, the gasket 50 is appropriately pressed (compressed) toward the collector terminal 40 (especially toward the rounded surface 740). As illustrated in FIG. 4, an acute angle β is defined by the reference line X and the inclined surface Y2 of the protrusion 710. The inclined surface Y2 is remote from the hole axis of the through-hole 242. The inclined surface Y2 is located more outwardly than the inclined surface Y1 of the protrusion 710 in the radial direction of the through-hole 242. The incline or angle of inclined surface Y2 with respect to reference line X is preferably smaller than the acute angle α (i.e. α>β). That is, the inclined surface Y2 of the protrusion 70, which is remote from the hole axis of the through-hole 242 (which is located outward of the inclined surface Y1 in the radial direction of the through-hole 242), is preferably more inclined toward the through-hole 242 than the inclined surface Y1 of the protrusion 710, which is close to the hole axis of the through-hole 242 (which is located inward of the inclined surface Y2 of the protrusion 710 in the radial direction of the through-hole 242).

Figure 5:
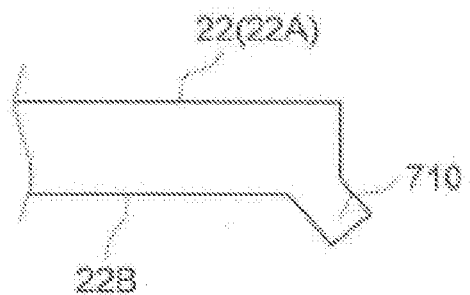
FIG. 5 is a schematic view illustrating an example of the structure in the vicinity of a through-hole of the lid during fabrication of the battery.
Figure 6:
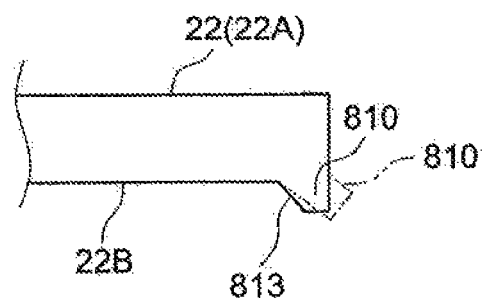
FIG. 6 is a schematic view illustrating another example of the structure in the vicinity of the through-hole of the lid during fabrication of the battery.
Figure 7:
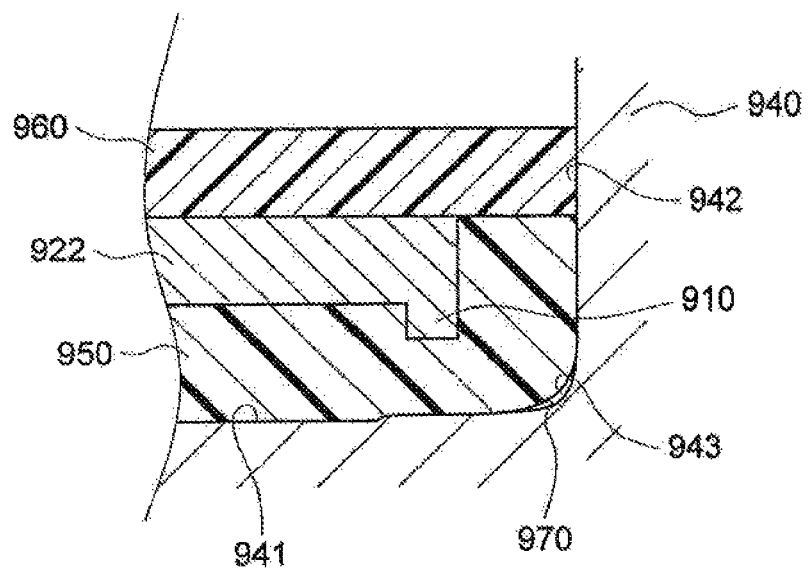
FIG. 7 is a schematic sectional view of a conventional sealing structure including a lid, a collector terminal, and an insulating seal (gasket).

The protrusion 710 inclined toward the direction of the hole axis of the through-hole 242 (toward the through-hole 242) is formed by, for example, preparing a lid preliminarily provided with a protrusion inclined toward the direction of the hole axis of the through-hole (toward the through-hole 242) as illustrated in FIG. 5 and riveting the projection 426 of the collector terminal 40. Alternatively, the lid 22 may be provided with a downward protrusion 810 protruding from the bottom surface 22B of the lid 22 as illustrated in FIG. 6. In this case, the protrusion 810 has a surface 813 that is remote from the through-hole (that is located outward of the outer side surface of the protrusion 810 in the radial direction of the through-hole). At least a part of the surface 813 is tapered. Then, the projection 426 of the collector terminal 40 is riveted. During riveting, stress is applied in the thickness direction of the lid 22, and stress in the radial direction of the through-hole is generated in the protrusion 810 due to the tapered surface 813 of the protrusion 810. The generated stress may incline the protrusion 810 toward the through-hole (See the dotted line in FIG. 6). The latter method is easier than the former method. In the structure of the battery fabricated by the latter method, at least part of the side surface (i.e., the tapered surface 813) of the protrusion 810, which is remote from the through-hole, is more inclined toward the direction of the hole axis of the through-hole than the side surface of the protrusion 810, which is close to the through-hole. That is, the latter method makes it possible to easily form the protrusion 810 configured like the protrusion 710 in FIG. 4 formed such that the acute angle β defined by the reference line X and the inclined surface Y2 of the protrusion 710, which is remote from the hole axis of the through-hole 242, is smaller than the acute angle α (α>β) as illustrated in FIG. 4. In the present embodiment, the lithium-ion secondary battery 10 other than the protrusion 710 or 810 is fabricated by any commonly-employed method.

While the protrusions 710, 810 having a rectangular section have been described above, the sectional shape of the protrusions 710, 810 is not limited to a rectangular shape. The protrusions 710, 810 may have any sectional shape, for example, a sectional shape including a curved line.

The negative electrode of the battery 10 in the present embodiment has substantially the same structure as that of the positive electrode other than the material of the negative-electrode collector terminal 80 (shown in FIG. 1). That is, the negative-electrode sheet 34 is connected to one end of the negative-electrode collector terminal 80 by, for example, resistance welding. The negative-electrode collector terminal 80 includes a negative-electrode inner terminal segment 820 (see FIG. 2) having substantially the same shape as that of the positive-electrode inner terminal segment 420, a projection 826, and a negative-electrode outer terminal segment 860. The projection 826 is riveted to connect the negative-electrode inner terminal segment 820 to the negative-electrode outer terminal segment 860. The riveting is performed with a gasket 50, the lid 22, and an insulator 60 disposed between the negative-electrode inner terminal segment 820 and the negative-electrode outer terminal segment 860, as in the positive-electrode side. A protrusion is provided around the through-hole 244 of the lid 22, as in the positive-electrode side. The negative-electrode outer terminal segment 860 has a first connection portion and a second connection portion, and is formed in a stepwise manner. A bolt 670 is passed from below through a bolt-passing hole provided in the second connection portion. The negative-electrode inner terminal segment 820, the projection 826, and the negative-electrode outer terminal segment 860 are preferably made of a highly conductive metal, and are typically made of copper. The materials and shapes of the gasket 50 and the insulator 60 are the same as those in the positive-electrode side.

While non-limiting embodiments have been described in detail, the embodiments should not be construed to limit the scope of this disclosure. The invention includes various modifications and changes of the embodiments disclosed.

What is claimed is:

1. A sealed battery comprising:
   an electrode assembly;
   a case having an opening portion and accommodating the electrode assembly therein;
   a lid closing the opening portion and having a through-hole;
   a collector terminal including an inner terminal segment electrically connected to the electrode assembly in the case, and a projection passing through the through-hole of the lid and projecting outward from the lid; and
   an insulating seal in contact with a bottom surface of the lid, the bottom surface being an inner side of the lid in a thickness direction of the lid, the inner side of the lid facing an inside of the case when the lid closes the opening portion, and the insulating seal providing sealing between the lid and the collector terminal,
   wherein the lid has a protrusion protruding from the bottom surface of the lid, the protrusion surrounding the through-hole,
   wherein the protrusion protrudes obliquely downward from the bottom surface of the lid to be inclined toward a hole axis of the through-hole such that a part of the protrusion protrudes into the through-hole, and
   an opening diameter of the through-hole is smallest at a position at which the part of the protrusion protrudes into the through-hole.

2. The sealed battery according to claim 1, wherein a first acute angle defined by a reference line extending along the bottom surface of the lid and a first inclined surface of the protrusion is within a range from 40° to 70°, in a section taken along a direction of the hole axis of the through-hole, the first inclined surface defining at least a part of the through-hole.

3. The sealed battery according to claim 2, wherein a second acute angle defined by the reference line and a second inclined surface of the protrusion is smaller than the first acute angle, in the section taken along the direction of the hole axis of the through-hole, the second inclined surface being located outward of the first inclined surface in a radial direction of the through-hole.

4. The sealed battery according to claim 1, wherein the part of the protrusion protrudes into the through-hole at an angle.

5. A sealed battery comprising:
a case having an opening portion;
a lid closing the opening portion and having a through-hole; and
wherein the lid has a protrusion protruding obliquely downward from the bottom surface of the lid, so as to be inclined toward a hole axis of the through-hole such that a part of the protrusion protrudes into the through-hole at an angle, wherein the protrusion has a first end which protrudes into the through-hole and a second end near the bottom surface of the lid, and a diameter of the through-hole is smaller near the first end of the protrusion than near the second end.

* * * * *